(12) United States Patent
Trost

(10) Patent No.: US 8,858,381 B2
(45) Date of Patent: Oct. 14, 2014

(54) AXLE ASSEMBLY HAVING A LUBRICANT RESERVOIR

(75) Inventor: Harry Trost, Royal Oak, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 205 days.

(21) Appl. No.: 13/610,988

(22) Filed: Sep. 12, 2012

(65) Prior Publication Data
US 2014/0069230 A1 Mar. 13, 2014

(51) Int. Cl.
*F16H 57/04* (2010.01)
(52) U.S. Cl.
USPC .............................. 475/160; 74/607
(58) Field of Classification Search
USPC .......................... 74/607; 475/160
See application file for complete search history.

(56) References Cited

U.S. PATENT DOCUMENTS

| | | |
|---|---|---|
| 1,966,434 A | 7/1934 | Barker |
| 2,242,195 A | 5/1941 | Teker et al. |
| 3,025,716 A * | 3/1962 | Muller ............................ 74/607 |
| 5,540,300 A | 7/1996 | Downs et al. |
| 6,132,329 A | 10/2000 | Tison |
| 6,843,746 B2 * | 1/2005 | Hayes et al. .................. 475/160 |
| 7,229,376 B1 * | 6/2007 | Irwin ............................. 475/160 |
| 2005/0005731 A1 * | 1/2005 | Brill et al. ...................... 74/607 |

FOREIGN PATENT DOCUMENTS

| | | |
|---|---|---|
| DE | 710894 C | 9/1941 |
| EP | 1375970 A2 | 1/2004 |
| EP | 2660493 A1 | 11/2013 |
| JP | 5937462 U | 3/1984 |
| JP | 2012210839 A | 11/2012 |

OTHER PUBLICATIONS

European Patent Office, Extended Search Report for the corresponding European Patent Application No. 13182565.5 mailed Dec. 2, 2013.

* cited by examiner

*Primary Examiner* — Sherry Estremsky
(74) *Attorney, Agent, or Firm* — Brooks Kushman P.C.

(57) ABSTRACT

An axle assembly having an axle housing that includes arm portion for receiving an axle. A dam may be disposed in the arm portion and may cooperate with the arm portion to define a reservoir that is configured to retain a volume of a lubricant. A conduit may deliver lubricant to the reservoir.

20 Claims, 5 Drawing Sheets

AXLE ASSEMBLY HAVING A LUBRICANT RESERVOIR

TECHNICAL FIELD

The present application relates to an axle assembly having a lubricant reservoir.

BACKGROUND

An axle assembly lubrication apparatus is disclosed in U.S. Pat. No. 6,132,329.

SUMMARY

In at least one embodiment, an axle assembly is provided. The axle assembly may include an axle housing, a dam, and a conduit. The axle housing may have a center portion and an arm portion. The arm portion may extend from the center portion and may receive an axle. The dam may be disposed in the arm portion. The dam may cooperate with the arm portion to define a reservoir that is configured to retain a volume of a lubricant in the arm portion. The conduit may extend from the center portion to the arm portion. The conduit may deliver lubricant from the center portion to the reservoir.

In at least one embodiment, an axle assembly is provided. The axle assembly may include an axle housing, a dam, and a conduit. The axle housing may include a center portion and an arm portion. The center portion may receive a differential. The arm portion may receive an axle and may extend from the center portion. The dam may be disposed in the arm portion below the axle. The dam and the arm portion may cooperate to define a reservoir that retains a volume of a lubricant in the arm portion. The conduit may extend from the center portion to the arm portion and may deliver the lubricant to the reservoir.

In at least one embodiment, an axle assembly is provided. The axle assembly may include an axle housing, a dam, and a conduit. The axle housing may have a first housing and a second housing. The first and second housings may cooperate to define a center portion that receives a differential and an arm portion that extends from the center portion and that receives an axle. The dam may be disposed in the arm portion. The dam may divide the first housing portion into a reservoir and a spillway. The spillway may be disposed between the dam and the center portion. The reservoir may be disposed opposite the spillway. The conduit may extend from the center portion to the arm portion. The conduit may deliver lubricant to the reservoir.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2:
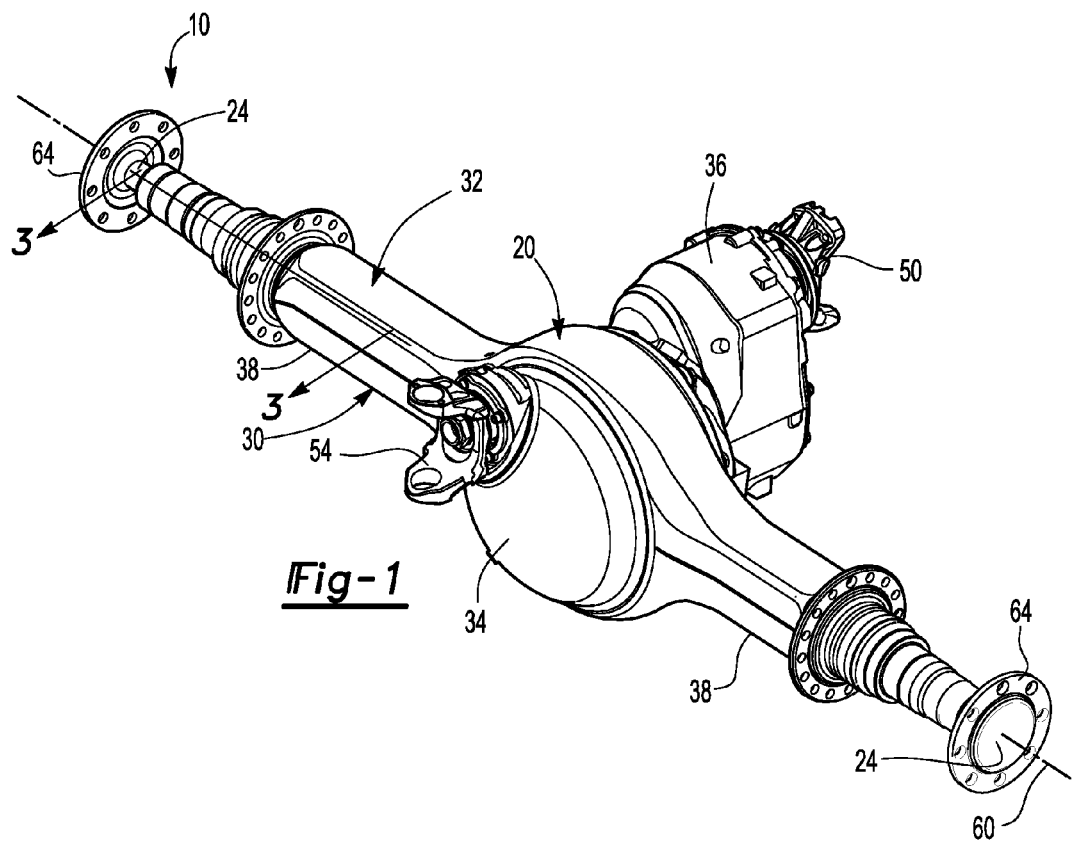
FIG. 1 is a perspective view of an exemplary axle assembly.
FIG. 2 is a perspective view of a portion of the axle assembly of FIG. 1.
Figure 3:
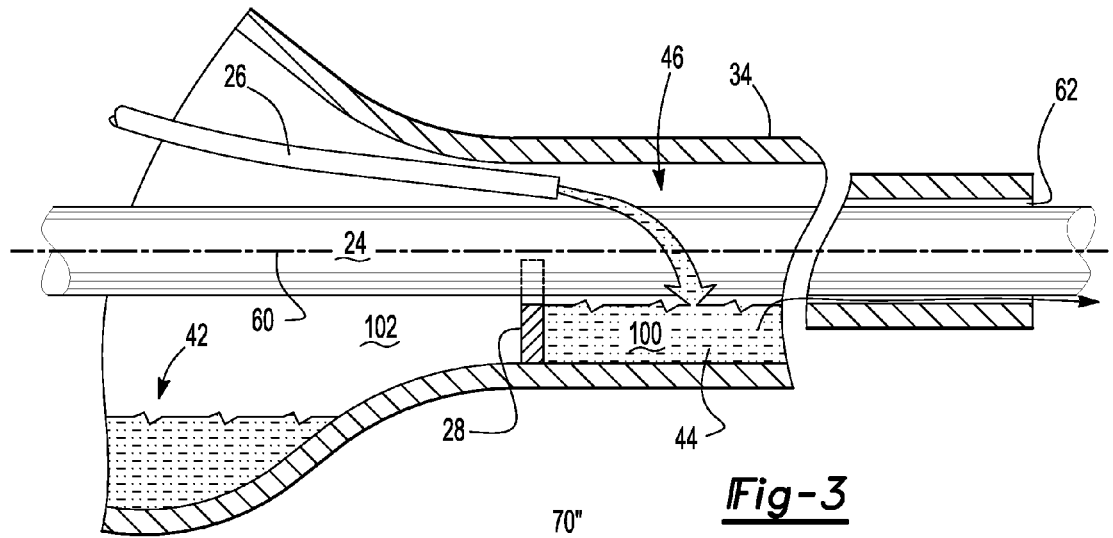
FIG. 3 is a section view of the axle assembly along section line 3-3.

Referring to FIGS. 1-3, an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 shown in FIG. 1 may be part of a tandem axle configuration or multi-axle configuration that includes a plurality of axle assemblies that may be connected in series.

In at least one embodiment, the axle assembly 10 may include an axle housing 20, a differential 22, at least one axle 24, at least one lubricant conduit 26, and at least one dam 28.

The axle housing 20 may receive various components of the axle assembly 10. In addition, the axle housing 20 may facilitate mounting of the axle assembly 10 to the vehicle. The axle housing 20 may include multiple components that may be assembled together in any suitable manner, such as by welding and/or with one or more fasteners. For example, the axle housing 20 may include a first housing 30 and a second housing 32 that may cooperate to define a center portion 34, a differential carrier portion 36, and at least one arm portion 38.

The first and second housings 30, 32 may at least partially define the axle housing 20. For instance, the first and second housings 30, 32 may generally form opposing halves of the axle housing 20. The first housing 30 may be disposed below the second housing 32 in one or more embodiments.

The center portion 34 may be disposed proximate the center of the axle housing 20. The center portion 34 may define a cavity 40 that may receive at least a portion of the differential 22. The region of the cavity 40 located below the differential 22 may at least partially define a sump portion 42 that may contain a lubricant 44. The lubricant 44 may flow down the sides of the center portion 34 and gather in the sump portion 42. The lubricant 44, which may be oil, may lubricate components of the axle assembly 10, such as the differential 22.

The differential carrier portion 36 may be disposed proximate the center portion 34. The differential carrier portion 36 may support components of the differential 22 and may also define a cavity that receives at least a portion of the differential 22. In at least one embodiment, the differential carrier portion 36 may be coupled to the center portion 34 in any suitable manner, such as with one or more fasteners like a bolt.

One or more arm portions 38 may extend from the center portion 34. In FIG. 1, two arm portions 38 are provided that extend in opposite directions from the center portion 34 and the differential 22. An arm portion 38 or a portion thereof may be integrally formed with the first housing 30, second housing 32, and/or the center portion 34 in one or more embodiments. Each arm portion 38 may define an arm cavity 46 that may receive an axle 24 and a dam 28 as will be discussed in more detail below. The arm portion 38 and arm cavity 46 may be disposed above the sump portion 42 in one or more embodiments.

The differential 22 may be disposed in the axle housing 20. The differential 22 may be configured to transmit torque to the vehicle traction wheel assemblies and permit the traction wheel assemblies to rotate at different velocities. An input yoke 50, a ring gear 52, and an optional output yoke 54 are highlighted in FIGS. 1 and 2 to facilitate an abbreviated discussion of the operation of the differential 22.

The input yoke 50 may facilitate coupling of the axle assembly 10 to a torque source. For example, the input yoke 50 may be coupled to a drive shaft that may be coupled to an output of a vehicle transmission. Alternatively, the input yoke 50 may be coupled to a connection shaft or prop shaft that may be coupled to an output yoke 54 of another axle assembly 10. The input yoke 50 may be disposed on an input shaft that may be rotatably supported by one or more bearings that may be disposed in the differential carrier portion 36 of the axle housing 20. Torque that is provided to the input yoke 50 and the input shaft may be transmitted to the ring gear 52 via various intermediate gears and to the output yoke 54, if provided. Torque may be transmitted from the ring gear 52 to each axle 24 and from each axle 24 to at least one corresponding wheel hub and/or traction wheel assembly.

The ring gear 52 may rotate about an axis and may splash lubricant 44 that accumulates in the sump portion 42 as it rotates. As will be discussed in more detail below, some lubricant 44 may be captured and routed to an arm cavity 46 to facilitate lubrication of other components and to reduce the volume of lubricant 44 in the sump portion 42 under various conditions. Reducing the volume of lubricant 44 in the sump portion 42 may reduce frictional drag that may be exerted upon the ring gear 52 by the lubricant 44 and may improve vehicle fuel economy.

One or more axles 24 may transmit torque from the differential 22 to a traction wheel assembly. In FIGS. 1 and 2, two axles 24 are provided such that each axle 24 extends through a different arm cavity 46. The axles 24 may extend along and may be rotated about an axis 60 by the differential 22. Each axle 24 may have a first end and a second end. The first end may be coupled to the differential 22. The second end may be disposed opposite the first end and may be located outside of the axle housing 20. More specifically, the second end may extend through an axle hole 62 (best shown in FIG. 3) that may be disposed at an end of an arm portion 38 of the axle housing 20. In one or more embodiments, lubricant 44 may be permitted to exit the axle hole 62 to help lubricate one or more wheel end components, such as one or more wheel bearings that may be disposed on the outside of the arm portion 38. As such, wheel ends or wheel end components may not be sealed to contain its own lubricant supply. An axle flange 64 may be disposed at the second end and may facilitate mounting of a wheel hub and/or traction wheel assembly. An axle bearing may be provided between the first and second ends of the axle 24 to rotatably support the axle 24. The axle bearing may be located in the arm cavity 46 between the dam 28 and the axle flange 64 in one or more embodiments.

At least one lubricant conduit 26 may be provided to route lubricant 44 to an arm portion 38. A lubricant conduit 26 may be configured to receive or capture lubricant 44 that is splashed or sprayed inside the axle housing 20 by the differential 22. For example, the lubricant conduit 26 or a portion thereof may be configured as a groove, tube, or channel that may receive lubricant 44 that is sprayed or splashed by the ring gear 52 or that drips down an interior surface of the center portion 34 into the lubricant conduit 26. The lubricant conduit 26 may be spaced apart from the ring gear 52 so as to not interfere with rotation of the ring gear 52 or strip lubricant 44 from the ring gear surfaces.

The lubricant conduit 26 may extend along an interior surface of the center portion 34 and the arm portion 38 of the axle housing 20. For example, the lubricant conduit 26 may be integrally formed with the axle housing 20. Alternatively, the lubricant conduit 26 may be provided as a separate component that may be coupled to the axle housing 20 in any suitable manner, such as by welding or with a fastener. In addition, a lubricant conduit 26 or a portion thereof may slope downwardly from the center portion 34 of the axle housing 20 toward an arm portion 38 to facilitate the flow of lubricant 44 to the arm portion 38.

A lubricant conduit 26 may route lubricant 44 to one or more arm portions 38. For instance, a single lubricant conduit 26 may be provided that has opposing ends that terminate at different arm portions 38. Alternatively, a lubricant conduit 26 may provide lubricant 44 to a single arm portion 38 as depicted in FIG. 2. More specifically, two lubricant conduits 26 are shown in FIG. 2 that provide lubricant 44 to different arm portions 38. In addition, the lubricant conduit 26 may be disposed above the axle 24 and/or at least partially disposed above the dam 28.

The lubricant conduit 26 may be provided in various configurations. For example, each lubricant conduit 26 may include an inlet 70 and an outlet 72.

The inlet 70 may be disposed in the cavity 40 of the center portion 34 to help capture lubricant 44 as previously described. For instance, the inlet 70 may be disposed near or at a first end of the lubricant conduit 26. The inlet 70 may be configured as an upward facing opening that may face away from the sump portion 42 and through which lubricant 44 may be received. Such an inlet 70 may be provided by removing an upper section of a pipe or tube in one or more embodiments or by integrally forming a groove or channel with the axle housing 20 as previously discussed. Alternatively, the inlet 70 may be fluidly connected to a pump or receive lubricant 44 that is supplied by a pump. As such, a pump may be used to pump lubricant 44 out of the sump portion 42 and into a lubricant conduit 26.

The outlet 72 may be spaced apart from the inlet 70. For instance, the outlet 72 may be disposed at a second end of the lubricant conduit 26 that may be disposed opposite the first end. The outlet 72 may be located in the arm portion 38 of the axle housing 20 and may terminate at or near a dam 28. More specifically, the outlet 72 may be configured to deliver lubricant 44 to a region of the arm portion 38 that is located along a side of the dam 28 that faces away from the differential 22. A portion of the lubricant conduit 26 located near the outlet 72 may include an enclosed portion 74. The enclosed portion 74 may be configured as a pipe, hose, or enclosed tube to help retain lubricant 44 within the lubricant conduit 26 as it is routed to the arm portion 38. For instance, the enclosed portion 74 of the lubricant conduit 26 may define a through hole through which lubricant 44 may flow. In at least one embodiment, the enclosed portion 74 may begin in the center portion 34 and may end at the dam 28. Alternatively, the enclosed portion 74 may be omitted in one or more embodiments.

Figure 4:
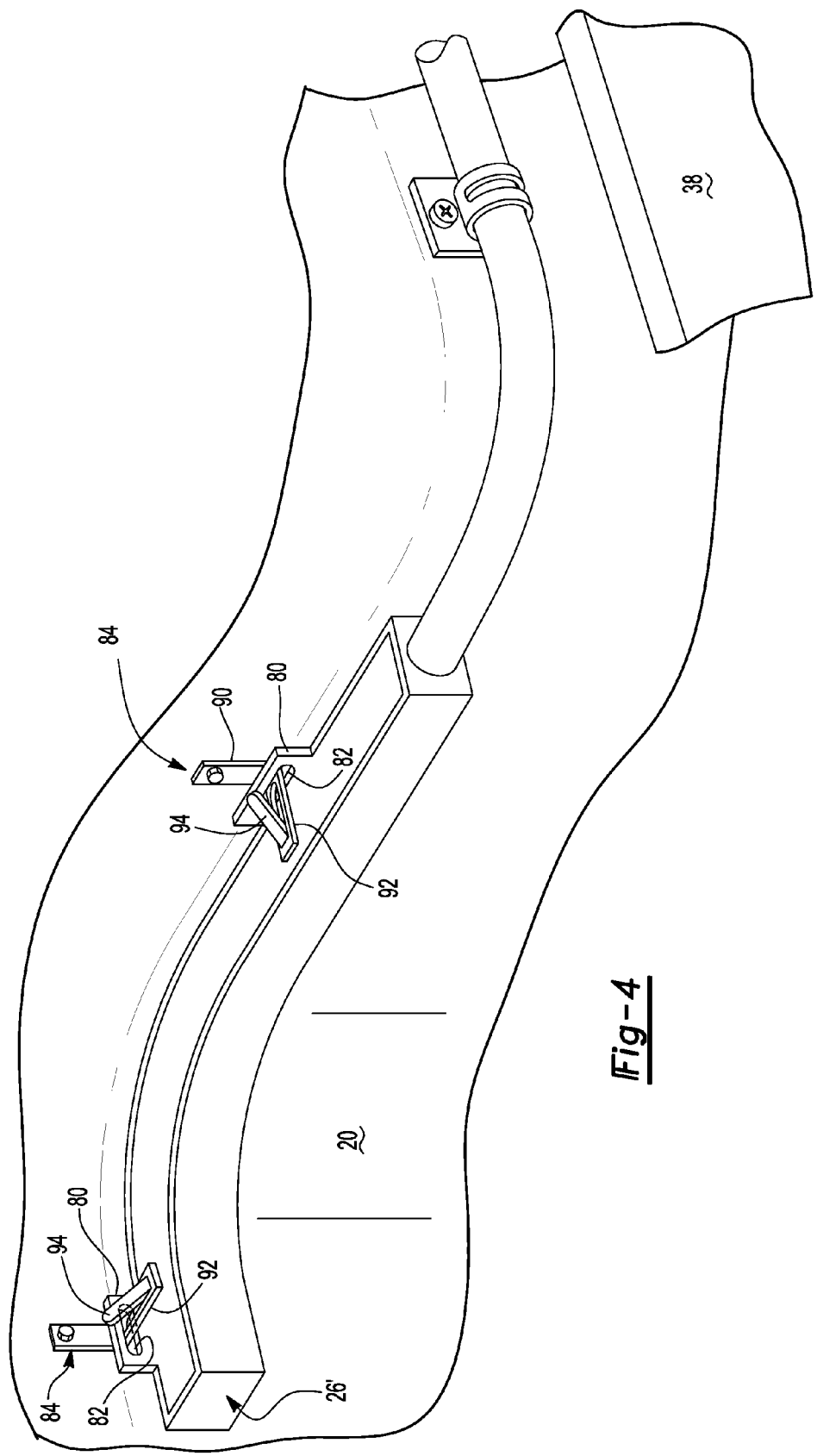

Referring to FIG. 4, another example of a lubricant conduit 26' is shown. In this example, the lubricant conduit 26' is a separate component from the axle housing 20. The lubricant conduit 26' may have plurality of tabs 80. Each tab 80 may have a hole 82 that may configured to receive a clip 84. The clip 84 may be fixedly disposed on the axle housing 20 in any suitable manner, such as by welding or with another fastener like a screw. The clip 84 may have a first portion 90, a second portion 92, and a barb 94. The first portion 90 may be disposed proximate the axle housing 20. The second portion 92 may extend from an end of the first portion 90 through the hole 82.

The barb 94 may extend from the second portion 92 toward the tab 80 and/or the first portion 90. The barb 94 may engage the tab 80 to inhibit movement of the lubricant conduit 26'.

Figure 5:
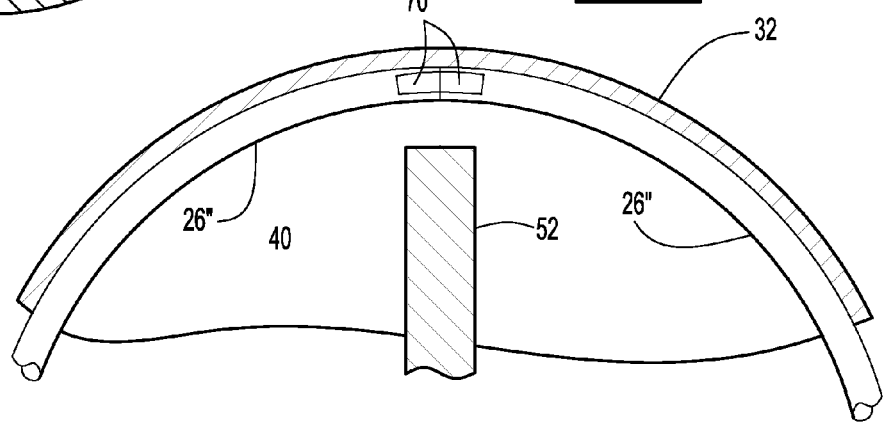
FIGS. 4 and 5 illustrate examples of conduits that may be provided with the axle assembly.

Referring to FIG. 5, another embodiment of a lubricant conduit 26" is shown. In this embodiment, the lubricant conduit 26" may extend generally above the differential 22, or along the second housing 32 and above the ring gear 52 to capture lubricant 44 that is sprayed by the ring gear 52. The inlet 70" of the lubricant conduit 26" may be located generally above the ring gear 52 or in a location where sufficient lubricant spray may be captured. The remainder of the lubricant conduit 26" may be enclosed or configured as a hose or pipe to help retain lubricant 44 within the lubricant conduit 26" as it is routed to the arm portion 38.

Referring to FIGS. 2 and 3, the dam 28 may be disposed in at least one arm cavity 46 and may help capture or store a volume of lubricant 44 in the arm cavity 46 remotely from the sump portion 42. The dam 28 may be fixedly disposed on the axle housing 20 and may divide the arm portion 38 into a reservoir 100 and a spillway 102. The reservoir 100 may be at least partially defined by the dam 28 and the axle housing 20 and may be configured to store a volume of lubricant 44. The spillway 102 may be disposed on an opposite side of the dam 28 from the reservoir 100. For instance, the spillway 102 may be disposed between the dam 28 and the differential 22 and/or the center portion 34. The spillway 102 may permit lubricant 44 that overtops the dam 28 or flows through openings in the dam 28 to flow to the sump portion 42. The dam 28 may inhibit lubricant 44 stored in the reservoir 100 from leaking around the dam 28 or passing between the dam 28 and adjacent surfaces of the axle housing 20 and into the spillway 102.

Referring to FIGS. 2, 3 and 6-11, various dam configurations are shown. For clarity, different reference numbers are used to reference the dam in each figure, but the attributes discussed in the preceding paragraph may apply to each dam configuration.

In FIGS. 2 and 3, the dam 28 extends from the first housing 30 toward the second housing 32 and has a generally planar or wall-like configuration. The dam 28 may engage adjacent sides or surfaces of the first housing 30, such as left, right, and bottom sides, to inhibit lubricant 44 from flowing around the dam 28. Optionally, the dam 28 may also extend upward to engage the second housing 32. The dam 28 may be spaced apart from the axle 24 and may be disposed below the axis 60. As such, a volume of lubricant 44 may be captured behind the dam 28 and may be inhibited from flowing toward the center portion 34 and into the sump portion 42.

Figure 6:
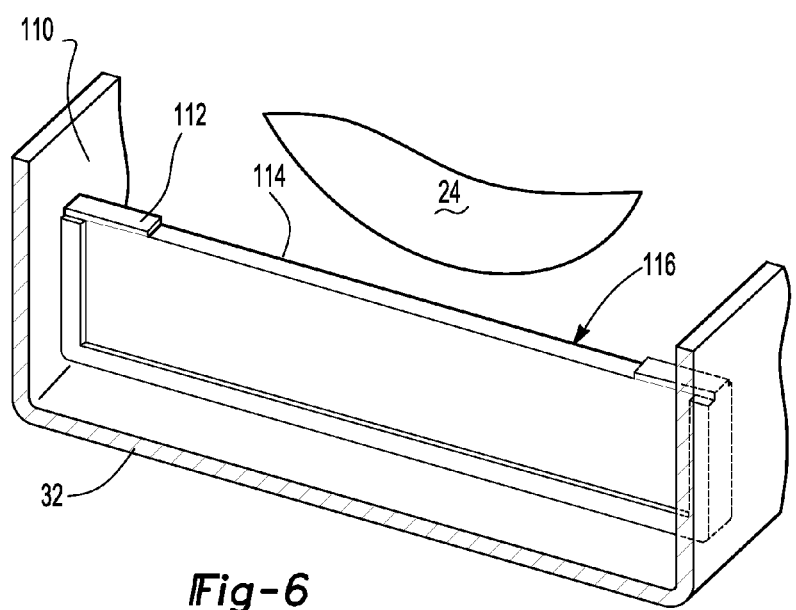
FIGS. 6-11 illustrate examples of dams that may be provided with the axle assembly.

In FIG. 6, a dam 110 is shown that has a multi-piece construction that includes a frame 112 and a wall portion 114. The frame 112 may engage the first housing 30 to inhibit lubricant 44 from flowing around the dam 28. The frame 112 may be press fit into place and may define a frame opening 116. The wall portion 114 may be received in the frame opening 116 and may be spaced apart from the first housing 30. As such, the frame 112 may extend at least partially around the wall portion 114 to hold and position the wall portion 114. The wall portion 114 may be made of a flexible material, such as rubber.

Figure 7:
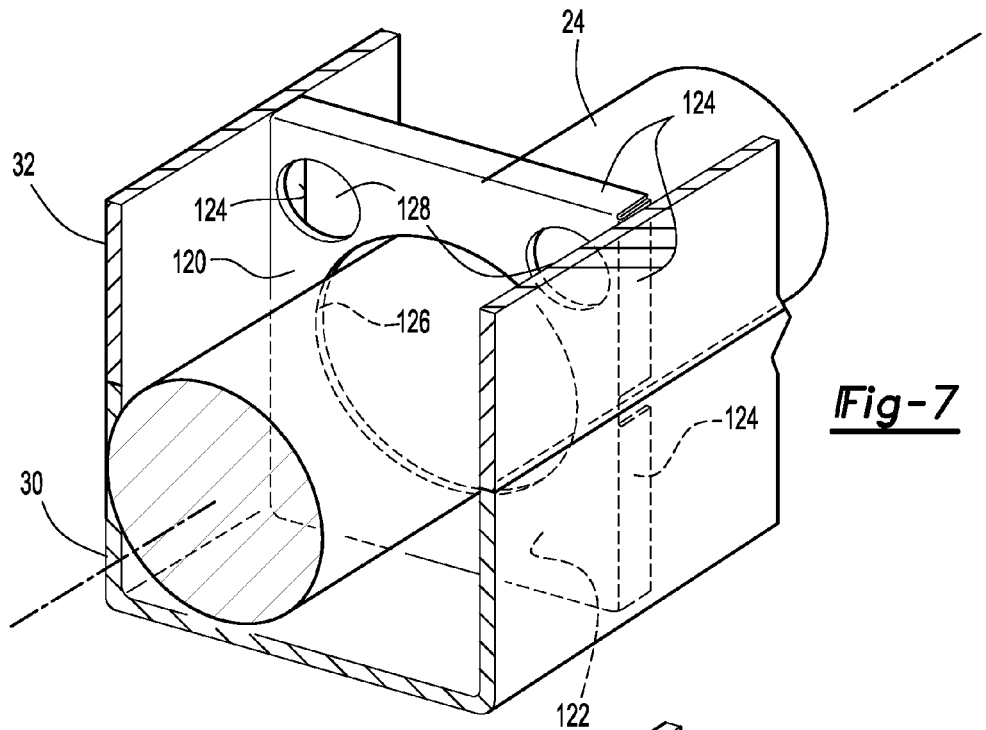

In FIG. 7, the dam 120 has a wall portion 122 and a plurality of flange walls 124 that extend from the wall portion 122. The flange walls 124 may engage the arm portion 38 to inhibit the flow of lubricant 44 around the dam 120. The flange walls 124 may extend in a common direction, such as away from the differential 22, and may be configured to bend or flex to permit the dam 120 to be press fit into the arm portion 38. A gap may be provided with one or more flange walls 124 that engage the first and/or second housings 30, 32 to accommodate slight misalignment or mismatching of the interior surfaces of the first and second housings 30, 32. The wall portion 122 may include an axle opening 126 and a conduit opening 128. The axle 24 may extend through and may be spaced apart from the axle opening 126. A lubricant conduit 26 may extend through the conduit opening 128.

Figure 8:
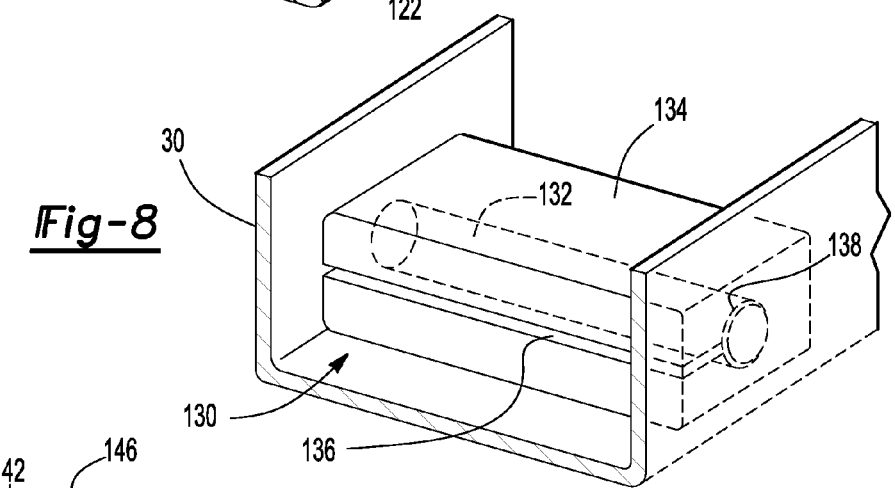

In FIG. 8, the dam 130 includes a mounting rod 132 and a dam block 134. The mounting rod 132 may be fixedly disposed on the axle housing 20. For instance, the mounting rod 132 may include first and second ends that are fixedly attached to opposing walls of the first housing 30, such as by welding. The dam block 134 may be mounted to the mounting rod 132. For instance, the dam block 134 may be made of a resilient material, such as rubber, and may be engage surfaces of the first housing 30 to inhibit lubricant 44 from leaking between the dam block 134 and the first housing 30. The dam block 134 may include a slot 136 and a hole 138. The slot 136 may extend from an exterior surface of the dam block 134 to the hole 138. For example, the slot 136 may be disposed on a side of the dam block 134 disposed opposite the reservoir 100 to help resist disengagement during installation of the axle 24 and/or due to force exerted by lubricant 44 in the reservoir 100. The hole 138 may receive the mounting rod 132. As such, the slot 136 may facilitate installation of the dam block 134 by allowing the mounting rod 132 to slide through the slot 136 and into the hole 138.

Figure 9:
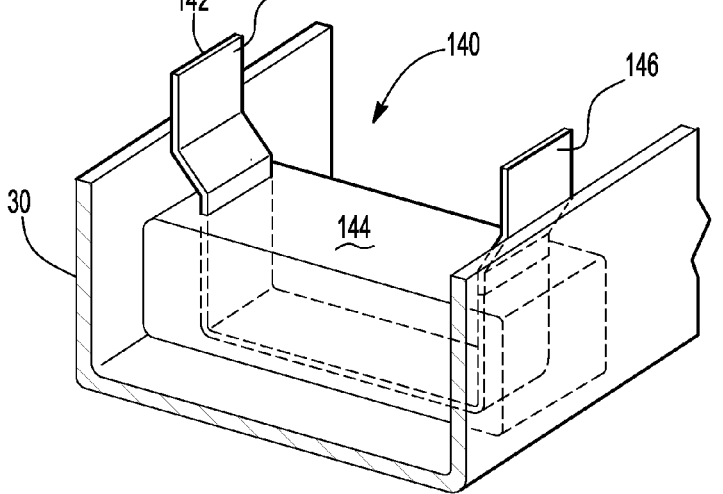

In FIG. 9, the dam 140 includes a mounting bracket 142 and a dam block 144. The mounting bracket 142 may be at least partially disposed in the dam block 144. In at least one embodiment, the mounting bracket 142 may have a generally U-shaped configuration and may include a pair of arms 146 that extend from the dam block 144. The mounting bracket 142 may be fixedly disposed on the axle housing 20 in any suitable manner, such as by welding the arms 146 to the axle housing 20. The dam block 144 may be fixedly disposed on the mounting bracket 142 and may be made of any suitable material, such as a resilient material like rubber. The dam block 144 may engage surfaces of the first housing 30 to inhibit lubricant 44 from leaking between the dam block 144 and the axle housing 20.

Figure 10:
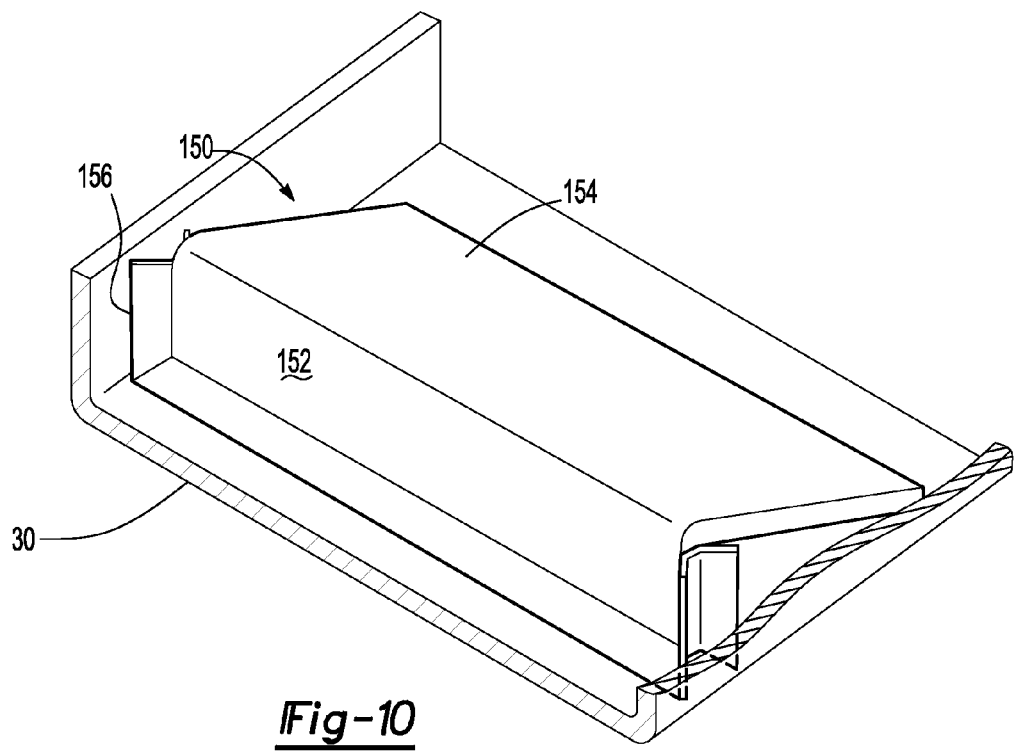

In FIG. 10, the dam 150 has a ramp-like configuration that includes a first wall 152 and a second wall 154. The first wall 152 may extend from the first housing 30 toward the second housing 32. A seal 156 may be provided on the first wall 152 along edges that are disposed adjacent to the first housing 30, such as left, right, and bottom edges. The seal 156 may engage the first housing 30 and may be made of a resilient material, such as rubber, to inhibit lubricant 44 from flowing around the first wall 152. The second wall 154 may extend from the first wall 152. In the embodiment shown, the second wall 154 extends at an angle from a top edge of the first wall 152 in a direction that extends downward or toward the first housing 30. The second wall 154 may be fixedly coupled to the axle housing 20. For instance, the second wall 154 may be welded to the first housing 30 at a point of engagement, such as near an end of the second wall 154 that is disposed opposite the first wall 152. The second wall 154 may also act as a brace that may help the inhibit flexing of the first wall 152. In addition, the second wall 154 may be oriented to extend away from the differential 22 and into the reservoir 100. As such, the dam 150 and second wall 154 may act a ramp to help direct the axle 24 upward as it is moved toward the differential 22 during installation.

Figure 11:
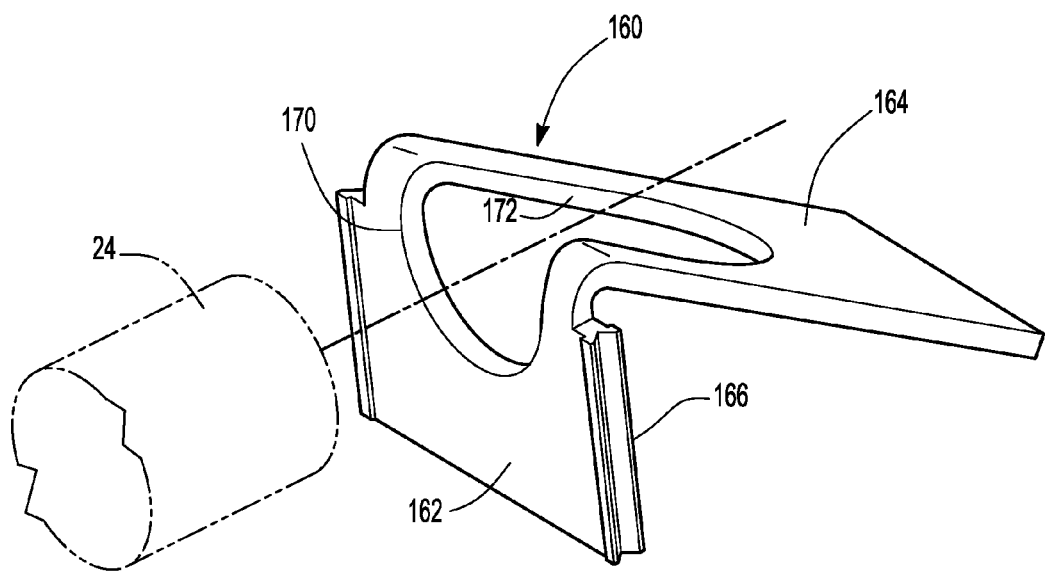

In FIG. 11, the dam 160 has a first wall 162 and a second wall 164 similar to the embodiment shown in FIG. 10. In this embodiment, the first wall 162 is taller than in FIG. 10 and may include a seal 166 that is similar to seal 156 and a first axle opening 170 through which the axle 24 extends. The second wall 164 includes a second axle opening 172 through which the axle 24 extends. The axle 24 may extend through the first and second axle openings 170, 172 such that the axle 24 is spaced apart from the first and second walls 162, 164.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    an axle housing having a center portion and arm portion that extends from the center portion, wherein the arm portion receives an axle;
    a dam that is disposed in the arm portion and cooperates with the arm portion to define a reservoir that is configured to retain a volume of a lubricant in the arm portion; and
    a conduit that extends from the center portion to the arm portion and is disposed above the dam;
    wherein the conduit delivers lubricant from the center portion to the reservoir.

2. The axle assembly of claim 1 wherein the axle is spaced apart from the dam.

3. The axle assembly of claim 1 wherein the axle is disposed above the dam.

4. The axle assembly of claim 1 wherein the dam includes a first wall that extends from the first housing and a second wall that extends from the first wall away from the differential and into the reservoir, wherein the second wall is fixedly coupled to the first housing.

5. The axle assembly of claim 1 wherein the conduit has an inlet that is disposed in the center portion and an outlet that is disposed in the arm portion.

6. The axle assembly of claim 1 wherein the center portion receives a differential and wherein the axle is rotatably coupled to the differential and extends through the arm portion.

7. The axle assembly of claim 6 wherein the reservoir is disposed on a side of the dam that is disposed opposite the differential.

8. An axle assembly comprising:
    an axle;
    an axle housing that includes:
        a first housing and a second housing that is disposed above the first housing, wherein the first and second housings cooperate to define a center portion that is adapted to receive a differential and an arm portion that receives the axle and extends from the center portion;
    a dam that is disposed in the first housing and that extends toward the second housing such that the dam is spaced apart from the second housing, wherein the dam and the arm portion cooperate to define a reservoir that retains a volume of a lubricant in the arm portion; and
    a conduit that extends from the center portion to the arm portion and delivers the lubricant to the reservoir.

9. The axle assembly of claim 8 wherein the arm portion includes an axle hole disposed at an end of the arm portion, wherein the axle extends through the axle hole and wherein lubricant in the reservoir exits the reservoir through the axle hole.

10. The axle assembly of claim 8 wherein the differential includes a ring gear that is disposed in the center portion, wherein the conduit includes an inlet that receives lubricant that is sprayed by the ring gear.

11. The axle assembly of claim 10 wherein the inlet is disposed above the ring gear.

12. The axle assembly of claim 8 wherein the dam includes a seal that engages the axle housing to inhibit lubricant from leaking between the dam and the axle housing.

13. An axle assembly comprising:
    an axle housing having a first housing and a second housing, wherein the first and second housings cooperate to define a center portion that receives a differential and an arm portion that extends from the center portion and that receives an axle;
    a dam that is disposed in the arm portion such that the dam divides the first housing into a reservoir and a spillway, wherein the spillway is disposed between the dam and the center portion and the reservoir is disposed opposite the spillway; and
    a conduit that extends from the center portion to the arm portion and delivers a lubricant to the reservoir.

14. The axle assembly of claim 13 wherein the dam includes a first wall that extends from the first housing toward the second housing, wherein a seal is disposed between the first wall and the first housing.

15. The axle assembly of claim 14 wherein the dam further comprises a second wall that extends from the first wall away from the differential and into the reservoir, wherein the second wall is fixedly coupled to the first housing.

16. The axle assembly of claim 15 wherein the first wall has a first axle opening and the second wall has a second axle opening, wherein the axle extends through the first and second axle openings.

17. The axle assembly of claim 13 wherein the dam includes a mounting rod that is fixedly disposed on the first housing and a dam block that receives the mounting rod and engages the first housing to inhibit lubricant from leaking between the dam block and the first housing and into the spillway.

18. The axle assembly of claim 13 wherein the dam includes a dam block and a mounting bracket, wherein the dam block engages the first housing to inhibit lubricant from leaking from the reservoir between the dam block and the first housing and into the spillway, and wherein the mounting bracket extends from the dam block and is fixedly disposed on the axle housing.

19. The axle assembly of claim 13 wherein the dam includes a frame that engages the first housing and a wall portion that is received in the frame and spaced apart from the first housing.

20. The axle assembly of claim 13 wherein the dam extends from the first housing toward the second housing such that the dam is spaced apart from the second housing.

* * * * *